US007290627B1

(12) United States Patent
Gardner (10) Patent No.: US 7,290,627 B1
(45) Date of Patent: Nov. 6, 2007

(54) EXTENDED RANGE MOTOR VEHICLE HAVING AMBIENT POLLUTANT PROCESSING

(76) Inventor: Conrad Oliver Gardner, 22905 108th Ave. W., Edmonds, WA (US) 98020

( * ) Notice: Subject to any disclaimer, the term of this patent is extended or adjusted under 35 U.S.C. 154(b) by 0 days.

(21) Appl. No.: 08/896,514

(22) Filed: Jun. 23, 1997

Related U.S. Application Data

(63) Continuation-in-part of application No. 08/273,114, filed on Jul. 7, 1994, now abandoned, which is a continuation-in-part of application No. 08/140,507, filed on Oct. 25, 1993, now Pat. No. 5,346,031, which is a continuation of application No. 07/867,412, filed on Apr. 13, 1992, now Pat. No. 5,301,764.

(51) Int. Cl.
*B60K 1/00* (2006.01)

(52) U.S. Cl. .................. 180/65.1; 180/65.2; 180/65.3; 180/65.4; 701/22

(58) Field of Classification Search ............... 180/65.1, 180/65.2, 65.3, 65.4, 65.8; 701/22, 69
See application file for complete search history.

(56) References Cited

U.S. PATENT DOCUMENTS

| 3,788,284 | A | | 1/1974 | Gardner .................. 123/119 A |
|---|---|---|---|---|
| 3,791,752 | A | * | 2/1974 | Gardner .......................... 404/2 |
| 3,889,464 | A | * | 6/1975 | Gardner ........................ 60/286 |
| 4,021,677 | A | * | 5/1977 | Rosen ........................ 290/40 R |
| 4,155,335 | A | * | 5/1979 | Hosaka et al. ............. 60/276 X |
| 4,165,795 | A | * | 8/1979 | Lynch et al. ................ 180/65.2 |
| 4,269,280 | A | * | 5/1981 | Rosen .................... 180/65.2 X |
| 4,335,429 | A | * | 6/1982 | Kawakatsu ............. 180/65.2 X |
| 4,755,988 | A | * | 7/1988 | Nelson et al. ................. 370/84 |
| 4,849,735 | A | * | 7/1989 | Kirtley et al. ........... 180/167 X |
| 4,878,050 | A | * | 10/1989 | Kelley ..................... 180/167 X |
| 4,878,472 | A | * | 11/1989 | Hibino ........................ 123/489 |
| 4,953,646 | A | * | 9/1990 | Kim ........................... 180/65.4 |
| 5,048,374 | A | * | 9/1991 | Miyake et al. ........... 180/179 X |
| 5,084,822 | A | * | 1/1992 | Hayami ...................... 364/449 |
| 5,170,624 | A | * | 12/1992 | Cornelison et al. ........... 60/300 |
| 5,176,213 | A | * | 1/1993 | Kawai et al. .............. 180/65.4 |
| 5,276,728 | A | * | 1/1994 | Pagliaroli et al. ....... 180/287 X |
| 5,280,267 | A | * | 1/1994 | Reggiani ................ 180/287 X |
| 5,315,298 | A | * | 5/1994 | Morita ........................ 340/995 |

* cited by examiner

*Primary Examiner*—Lesley D. Morris
*Assistant Examiner*—Daniel Yeagley
(74) *Attorney, Agent, or Firm*—Conrad O. Gardner (57) ABSTRACT

A hybrid motor vehicle utilizing electric motor propulsion prior to cruise mode detection condition and internal combustion engine propulsion during cruise mode. The hybrid motor vehicle utilizing an information super highway for system diagnostics or operating mode control as between powering the hybrid motor vehicle by electric motor or internal combustion engine. The exhaust manifold external surface temperature may be utilized to heat a catalyst for processing ambient air surrounding the vehicle.

6 Claims, 5 Drawing Sheets

EXTENDED RANGE MOTOR VEHICLE HAVING AMBIENT POLLUTANT PROCESSING

RELATED APPLICATIONS

This is a continuation in part of application Ser. No. 08/273,114 filed on Jul. 7, 1994 now abandoned which is a continuation in part of application Ser. No. 08/140,507 filed on Oct. 25, 1993, now U.S. Pat. No. 5,346,031 issued Sep. 13, 1994 which is a continuation of application Ser. No. 07/867,412 filed on Apr. 13, 1992, now U.S. Pat. No. 5,301,764 issued Apr. 12, 1994.

BACKGROUND OF THE INVENTION

Electronic propulsion systems for motor vehicles have been proposed to completely eliminate emissions: however, as is well known, present technology requires bulky batteries which have to be recharged for long periods of time. The capacity of such batteries provide only limited range for the motor vehicle. One solution to this problem is shown in my U.S. Pat. No. 3,791,752 issued Feb. 12, 1974, where an on board electrical power pack is required until electrical power can be derived from an electrified highway system. Unfortunately, the capital investment required for such systems is not available at this time and an alternative solution to the long battery charge problem is shown subsequently herein as a preferred embodiment of the present invention.

Automobile manufacturers have been devoting enough efforts through R and D to satisfy E.P.A. requirements by utilizing electronic controls to control emissions from I.C. (internal combustion) engines over their entire operating range, viz., during acceleration, etc., and over a great range of power demands and wide range of speeds. However valiant such efforts are considered from an environmental standpoint, such efforts to clean up emissions over the entire operating range have been only moderately successful at best.

The first effort utilizing electronic modulation to control EGR flow is shown in my U.S. Pat. No. 3,788,284 issued Jan. 29, 1974.

Hybridization has been recognized where the I.C. engine is operated at maximum efficiency and lowest possible emissions in a series or parallel configuration with the electric propulsion system as seen in U.S. Pat. No. 4,021,677 issued Mar. 3, 1975. In such a hybrid system, the I.C. system utilizes the electric motor for supplementary power at heavy power demand times.

Another hybrid drive I.C. electric propulsion combination is shown in U.S. Pat. No. 4,165,795 issued Aug. 28, 1979, wherein the I.C. engine is operated in an optimum mode at a substantially constant speed and power level in which the I.C. engine produces the least amount of pollutants.

As for operation of I.C. engine propelled systems, automobile manufacturers have struggled to control the air-fuel ratio for best conversion efficiency of a three-way catalyst in the exhaust system for best emission characteristics (see, e.g., U.S. Pat. No. 4,878,472 issued Nov. 7, 1989).

BRIEF SUMMARY OF THE INVENTION

A hybrid I.C., is an electric motor propulsion system which shifts to I.C. engine propulsion for vehicle operation when the cruise mode is reached. Cruise mode occurs when rapidly shifting power and speed demands are not occurring for predetermined periods of time. In the cruise mode, propulsion is provided by a smaller I.C. engine operating within a small range of speeds about its most efficient operating speed from a power and pollutant output standpoint. In the cruise mode as defined, only a substantially constant power output level is required to propel the vehicle along the highway, since demands by cruise level definition are not changing but are substantially constant. When the non-electric cruise mode power plant, e.g., the I.C. engine, is not employed to drive the motor vehicle, the non-electric power plant is utilized to charge a fast charge-discharge battery.

The hybrid motor vehicle features response to ambient pollutant levels, e.g. carbon monoxide or other pollutant levels which cause a pollution alert to be given by air quality authorities in a metropolitan area when predetermined levels are exceeded. Such responses may shut down cruise mode operation and cause the present hybrid vehicle to operate in the electrical power mode in response to a CO detector mounted on the vehicle or in response to a regional CO level signal generated by the regional air quality authority and transmitted to the hybrid vehicles through an information super highway comprising e.g. a plurality of interconnected or coupled data transmission networks including telephone lines, telephone switching networks and microwave relay channels such as cellular telephone links.

A further feature of the present hybrid motor vehicle system includes engine emission analysis and transmission of such data via information super highway data link for analysis and comparison with factory specifications at a remote central location such as a motor vehicle factory to determine undesireable operation e.g. due to emission component combustion engine defects or adjustments due to wear or other causes.

DETAILED DESCRIPTION OF THE PREFERRED EMBODIMENT

Figure 1:
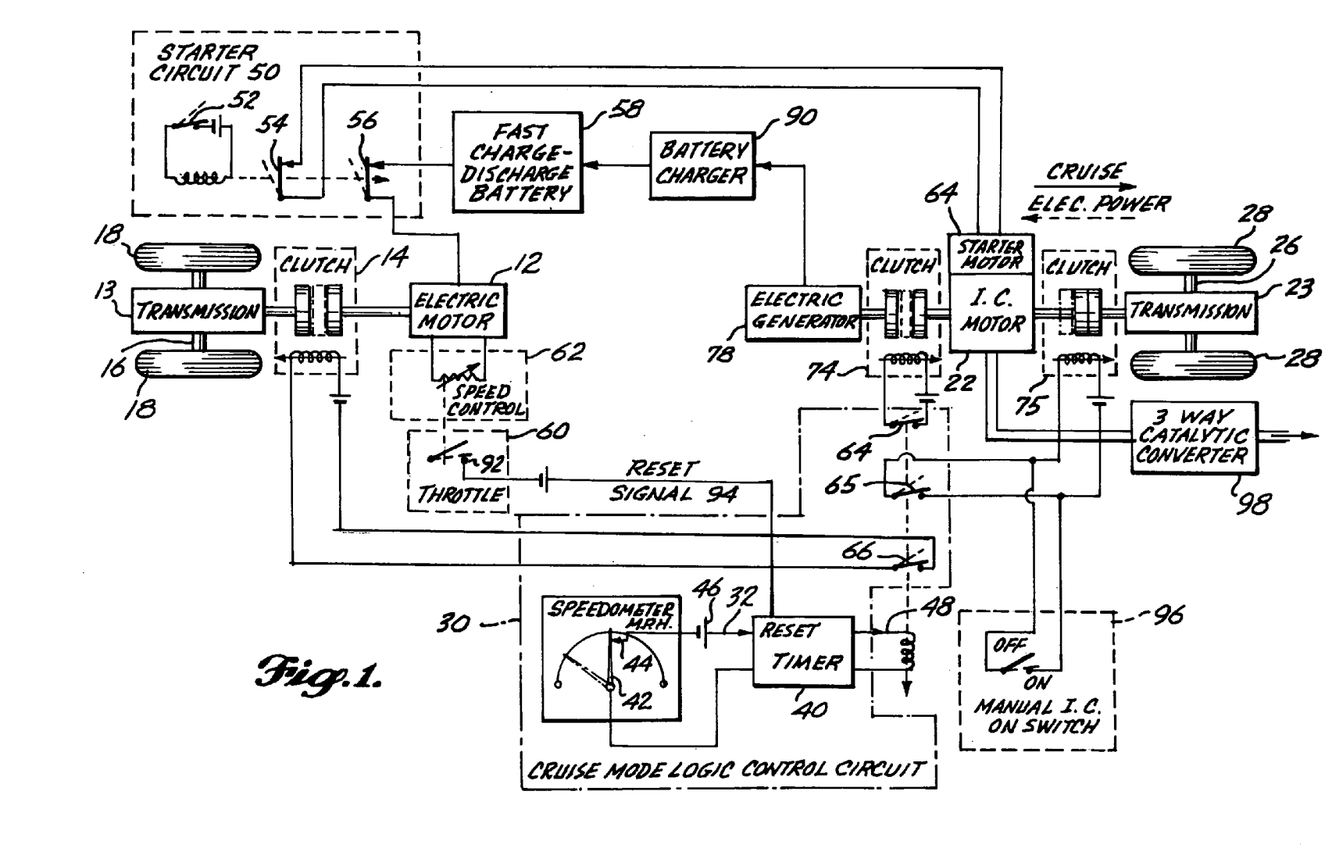
FIG. 1 is a schematic diagram of a preferred embodiment of the present hybrid motor vehicle system, showing cruise mode operation.

The hybrid motor vehicle propulsion system of FIG. 1 for motor vehicles utilizes an electrically operated power plant comprising an electric motor 12 coupled by means of a drive shaft through a clutch 14 to provide driving power through a first axle 16 to a pair of wheels 18 of the motor vehicle. A non-electrically operated power plant comprising an I.C. engine 22 provides driving power through a second axle 26 to a further pair of wheels 28. Separate drive of each of two axles greatly simplifies the complexity of what would be required if both the electric and non-electric power plants were attempted to be coupled to drive the same axle and pair of wheels, since the characteristics of each are different with attendant design requirements. In the present system, the non electric power plant comprising, e.g., I.C. engine 22, is utilized in the cruise mode as described hereinafter in more detail, while the electric power plant comprising electric motor 12 is utilized primarily when conditions for cruise mode operations are not satisfied. In the interests of providing a low pollution, high-performance vehicle, electric motor 12 is utilized to power the vehicle during acceleration (when pollutant levels from state-of-the-art I.C. powered motor vehicles is high), while I.C. engine 22 is utilized to power the vehicle during cruise mode of operation. Electric motor 12 develops maximum torque at low speeds when high torque is necessary for acceleration, and I.C. engine 22 not being powerful at low rotational speeds is utilized in the present system during the cruise mode when less power is required, resulting in utilization in the present system of a lower horsepower I.C. engine (e.g., 20 to 30 percent of the horsepower of present I.C. powered vehicles), which lower horsepower engine can then be operated under a restricted set of conditions at relatively constant speed and low load demands in the cruise mode. Since I.C. engine 22 is operated under a restricted set of conditions, unlike the many conditions of operation of present I.C.-only powered vehicles. It becomes possible to adjust the engine for optimum efficiency and minimal emission output. While transmission 13 has been shown in the schematic, such may comprise, e.g., a one to one ratio direct drive transmission for electric motor 12, with transmission 23 offering the system designer flexibility, also, in coupling power from I.C. engine 22 to rear wheels 28.

CRUISE MODE OPERATION

Turning now to cruise mode logic control circuit 30, which is a small computer in which a vehicle speed signal above a predetermined level (e.g., 40 miles per hour) generates an ON signal 32 to start timer circuit 40. ON signal 32 is provided when the speedometer indicator needle 42 closes switch 44 in circuit with battery voltage source 46. Switch 44 stays closed at all speeds above a predetermined level shown here as 40 mph. Timer circuit 40 is set for a predetermined time interval (e.g., 45 seconds) after being turned into an ON condition by ON signal 32, so that a cruise mode logic output signal 48 is only provided under two conditions: First, the speed of the vehicle must be above 40 mph; and second, that speed must be maintained for at least the predetermined time interval of e.g., 45 seconds. If the speed drops below 40 mph, then timer circuit 40 waits until at least a 40 mph speed is detected by the closing of switch 44, again starting timer circuit 40 for a determination that ON signal 32 is at least present again for the predetermined time period of 45 seconds.

Turning now to starter circuit 50 of FIG. 1, it can be seen that with the initial closing of switch 52 by the operator to start the vehicle, switches 54 and 46 are caused to close. Closing of switch 56 closes the circuit path between fast charge-discharge battery 58 an electric motor 12, thereby permitting vehicle throttle 60 linked to speed control rheostat 62 to control the speed of electric motor 12. Also with switch 54 closed, starter motor 64 causes I.C. engine 22 to be started to run in the optimum mode of substantially constant speed and power level with starter motor ceasing operation upon start up of I.C. engine 22.

CRUISE MODE LOGIC OUTPUT SIGNAL 48

The system of FIG. 1 is shown operating with all switches and clutch positions in the cruise mode. With cruise mode signal 48 present, switches 64, 65, and 66 are held in the closed circuit position shown. With switches 64, 65 and 66 in the closed circuit position, power is applied to electromagnetically operated clutches 14, 74, and 75. Clutch 14, since power is applied (switch 66 being closed) is in its energized condition which is open (as shown by the solid line representation of the opposing clutch plates), while clutch 74 in its energized condition is open (as shown by the solid line representation of the opposing clutch plates). With switch 65 also energized to a closed position (also by the presence of cruise signal 48), clutch 75 is held in an energized closed position (as shown in the solid line representation of the clutch plates).

Recalling that cruise mode logic output signal 48 is present in an ON condition and I.C. engine 22 is running in the optimum mode at a substantially constant speed and power output level, it can be seen that power is transmitted from I.C. motor 22 through clutch 75 to transmission 23 and wheels 28. In this cruise mode of operation, clutch 74 is uncoupled from electric generator 78.

CRUISE MODE OFF CONDITION OF OPERATION

When there is no cruise mode logic output signal 48 present because the two conditions for cruise mode are not present, viz., the motor vehicle is not travelling above a predetermined level (e.g., 40 mph) and has not been traveling above such predetermined level, the predetermined time interval (e.g., 45 seconds), then upon such cruise mode OFF condition, switches 64,65, and 66 are in their open and de-energized positions (indicated by the dotted line representations).

With switches 66 in open position, clutch 14 plates are in their relaxed (dotted line) closed position permitting normal throttle 60 operation of linked speed control rheostat 62 to control the speed of electric motor 12, and consequently accelerate the motor vehicle through clutch 14, transmission 13, and wheels 18. Recalling that upon closing of switch 52 in starter circuit 50, switch 54 closed starting motor 64 and started I.C. engine 22, which starter motor becomes de-energized upon detection of start up of I.C. engine 22; even though switch 54 is shown closed during entire engine operation, in which switch 52 also remains closed. Switch 56, since also energized closed during entire vehicle operation (through start up closure of switch 52), permits fast discharge battery 58 to power electric motor 12 upon throttle 60 demand. In this cruise mode OFF condition of operation, when the motor vehicle is operating under electric power, since there is no cruise mode logic output signal 48 present to close switches 64, 65, and 66, clutch 14 remains closed (dotted line representation), while clutch 75 is de-energized by switch 65 to the uncoupled position, and clutch 74, since de-energized, reverts to the closed position, as represented by clutch plate movement to the dotted line position (as also represented by the direction of motion, e.g., electric power dotted line representation). During this cruise mode OFF condition, I.C. motor 22 is seen driving electric generator 78 through clutch 74, which causes battery charger 90 to fast charge charge-discharge battery 58. Fast charge-discharge battery 58 comprised a battery capable of faster charge than the current lead acid batteries, e.g., a nickel cadmium battery, capacitor-battery storage device, e.g., as shown in U.S. Pat. No. 3,615,829 to Sprague issued Oct. 26, 1971, or other fast charge-discharge battery. While a fast charge-discharge battery 58 is shown in the present system to accept power from I.C. motor 22 driven generator 78, further combinations of batteries and storage devices, such as lead acid batteries, and/or capacitor energy storage, may be used in combination with the fast charge-discharge battery, which is capable of rapidly storing energy delivered during cruise mode OFF condition of operation.

ELECTRIC POWER TAKEOVER FROM CRUISE MODE

In certain operating circumstances, e.g., fast pass to overtake another vehicle when operating in the cruise mode, it may be desirable or necessary to revert to electric power. This can be accomplished by the operator quickly depressing throttle 60 to full throttle closing switch contact 92, thereby generating reset signal 94 to reset timer 40 causing an absence of cruise mode logic output signal 48 and reversion to electric power operation. As soon as cruise conditions are again met, a cruise mode logic output signal 48 will again be provided to return operation to cruise mode under power of I.C. motor 22.

EMERGENCY I.C. ENGINE POWER

In the event of an inoperable electric power condition under cruise mode OFF condition of operation due, e.g., to failed electric motor 12 or fast charge battery 58, it may become necessary to power the motor vehicle to a service area under sole power of low horsepower I.C. engine 22, and this may be accomplished in the present system by closing manual I.C. switch 96, which will close clutch 75, thereby permitting I.C. engine 22 to transmit power through transmission 23 to wheels 28.

RANDOM TIME PERIOD ILLUSTRATIVE OF SYSTEM RESPONSE DUE TO CHANGING MOTOR VEHICLE OPERATING CONDITIONS

Figure 2:
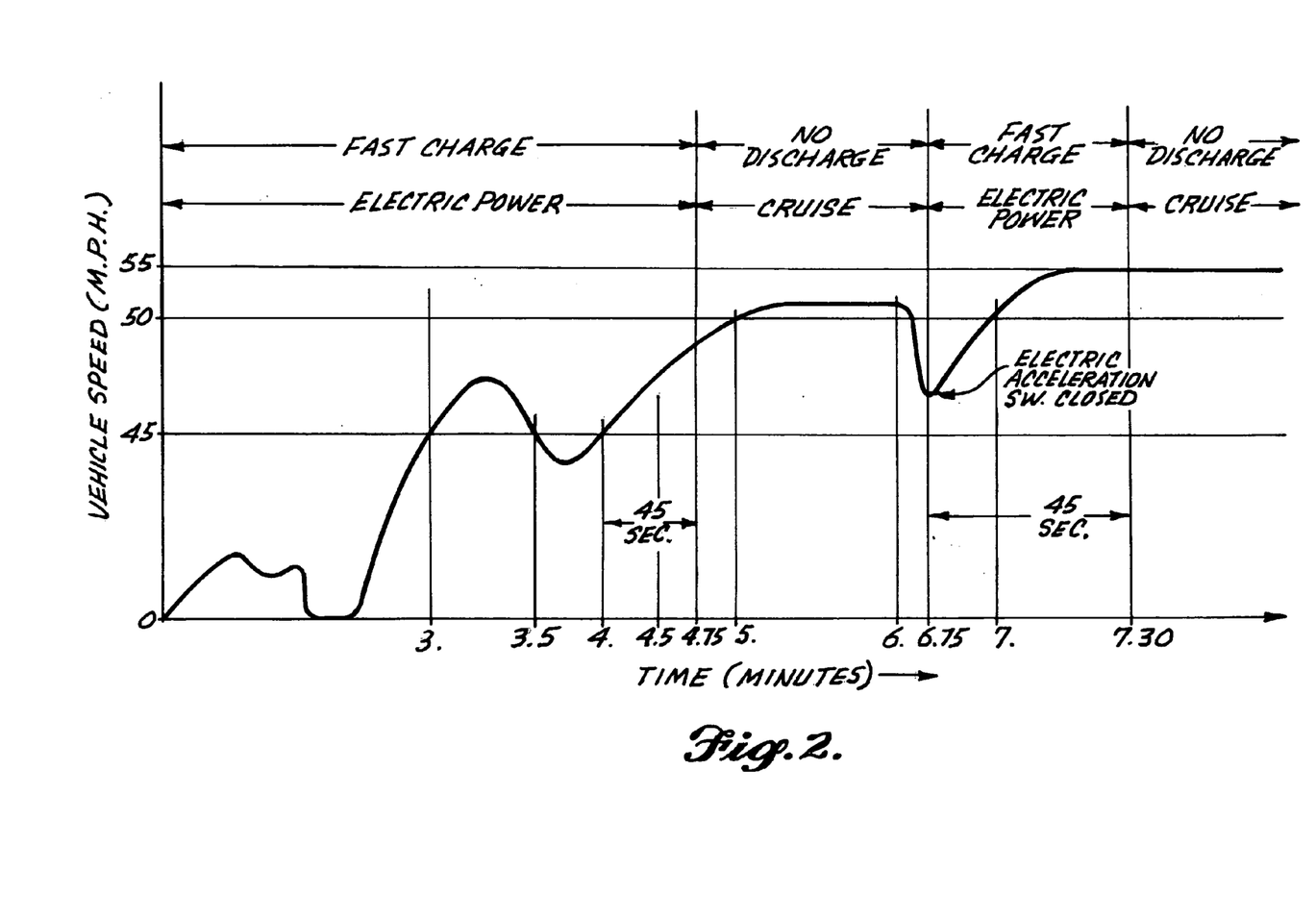
FIG. 2 is a graph illustrative of operating parameters of the system of FIG. 1, wherein the ordinate is representative of vehicle speed and the abscissa is representative of time.

The significant advantages which are inherent in the system of FIG. 1, which can be demonstrated from the vehicle operating graph of FIG. 2, include the following:
1. All the advantages and characteristics of an electric propulsion system are retained, including smooth no-stall acceleration with no pollution until the motor vehicle is brought up to a predetermined speed for a predetermined time period (Intro the cruise mode). Present I.C. powered vehicles offer substantial pollution control problems during acceleration.
2. Only a low power I.C. engine is required, since it is required to deliver only a small amount of power during cruise mode. Therefore, the added horsepower capacity required for acceleration in present I.C. powered vehicles (but not required during cruise) is eliminated.
3. Relatively constant speed and power demand from the I.C. engine in the cruise mode permits operation at a point of greatest efficiency and lowest emissions. For best efficiency of operation of a 3-way catalytic converter (98 in FIG. 1), the I.C. engine (22 in FIG. 1) can be operated at stoichiometric.
4. During non-cruise mode operation when electric propulsion is utilized in the present system of FIG. 1, low power I.C. engine 22, which continues to run, is utilized to transfer its power output into electric power which is captured and conserved in fast charge-discharge battery 58. Substantial loss of energy output from I.C. engine 22 would occur without the fast charge-discharge characteristics of battery 58. Further energy storage device(s) may be utilized in combination with fast charge discharge battery 58 (e.g., a lead acid battery pack, capacitor batteries, etc.) and different ones or combinations may have power drawn therefrom by electric motor 12; but essential efficiency in the present system is provided through utilization of a fast charge-discharge battery to aid in capturing and preventing power loss provided by constantly running I.C. engine 22.

Many further advantages, including the economic ones necessary to a successful commercial production thereof, will become readily apparent to those system designers skilled in the art, particularly since only a simple electric motor and low polluting small I.C. engine having minimal pollution control costs are required in the system of FIG. 1.

Turning now to FIG. 2 for an overview of system operation with respect to the embodiment of FIG. 1, it should be noted that starting out at a time=0, the vehicle is under electric motor 12 propulsion. Under electric power, clutch 14 is engaged, clutch 74 is engaged, and clutch 75 is disengaged. Under electric power, the two conditions hereinbefore mentioned which are required to provide cruise mode logic output signal 48 are not satisfied, viz., speed above a predetermined level for a predetermined period of time. While at 3 minutes speed is in excess of the exemplary predetermined level of 45 mph, this condition of speed in excess of 45 mph does not exist for the predetermined time period of 45 seconds but falls below 45 mph at time=3.5 minutes or 30 seconds. Such conditions would reflect typical city driving conditions. Again, at time=4 minutes, the first condition for cruise mode of speed exceeding 45 mph is satisfied. The second condition for cruise mode becomes satisfied at time=4.75 minutes, since the first condition of speed exceeding 45 mph has been maintained for the predetermined time period, viz., 45 seconds. Now, during electric propulsion occurring until time=4.75 minutes, the electric power source, including fast charge-discharge battery 58, is being discharged to power electric motor 12. Also, with clutch 74 engaged, I.C. motor 22 is charging fast charge-discharge battery 90 through electric generator 78 and battery charger 90. As hereinbefore mentioned, power from continuously running low horsepower I.C. motor 22 is not lost but rapidly captured through the charge capability of fast charge-discharge battery 58. Also, as hereinbefore mentioned, the electric power source, besides including fast charge-discharge battery 58, may include further electrical energy storage capacity, e.g., lead acid batteries and capacitor batteries with electric power supplied to electric motor 12 from such electric power source.

During cruise mode operation between time=4.75 minutes and time=6.75 minutes, cruise mode output signal 48 disengages clutch 14, and clutch 74, while causing clutch 75 to become engaged, with clutch 75 engaged low horsepower I.C. engine 22 (e.g., 20 to 30 percent of the horsepower of an equivalent weight I.C.-only powered state-of-the-art vehicle) drives wheels 28 through transmission 23 during, and as long as, cruise mode conditions are satisfied. Since clutch 74 is disengaged with clutch plates apart in an open condition, electric generator 78 is not being driven to charge fast charge-discharge battery 58. Also, since clutch 14 is disengaged, electric motor 12 is not operative to drive wheels 18. There is neither charging or discharging or electrical energy storage, including fast charge-discharge battery 58.

Notice that at time=6 minutes while in the cruise mode, the speed of the vehicle is dropping, as might occur on a steep upward incline such as in a mountain pass. Realizing the loss of vehicle speed, the operator of the vehicle desires instant powerful acceleration as can be provided by electric propulsion from electric motor 12. The operator depresses throttle pedal to the floor making contact with switch 92, thereby generating reset signal 94, which resets timer 40, causing cruise mode output signal 48 to turn OFF, thereby causing clutch 14 to return to an engaged condition, and clutch 75 to become disengaged. Until the first and second cruise mode conditions again become satisfied (such as at time=7.30 minutes), the vehicle does not return to the cruise mode. And upon return to the cruise mode, if the operator still needs hill-climbing power, instant full depression of throttle 60 will again close contact 92 to again generate reset signal 94.

Manual I.C. switch 96 hereinbefore discussed, permits the operator to power the vehicle in the event of some failure in the electrical propulsion system, e.g., failures in electrical energy storage or electric motor 12 failure.

Figure 3:
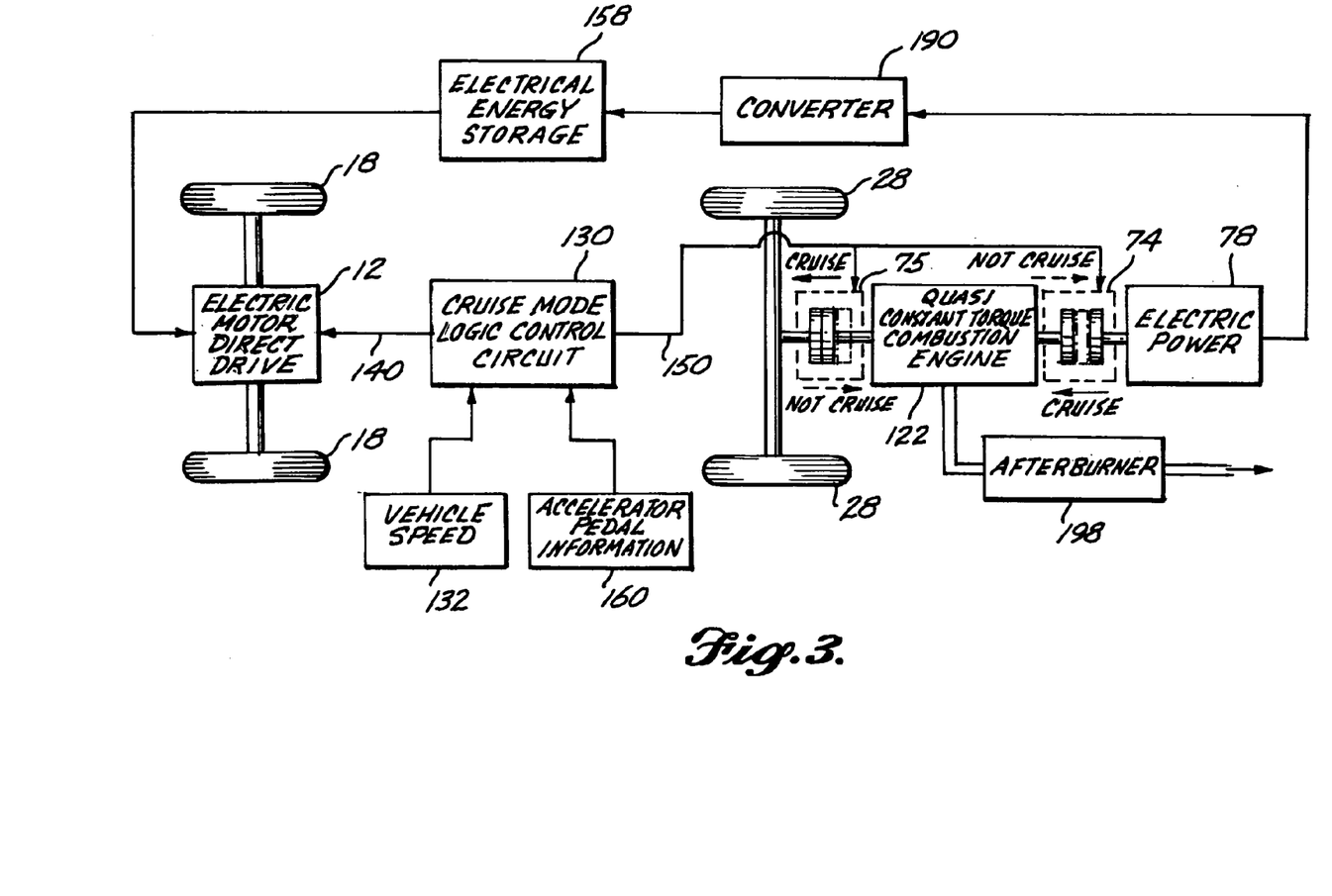
FIG. 3 is a system block diagram of a further embodiment of the invention.

Turning now to a further embodiment of the invention showing the block diagram of FIG. 3, it can be seen that as in the system of FIGS. 1 and 2, in the cruise mode, power is derived from a combustion engine 122 coupled through a clutch 75 to drive wheels 28, while in a non cruise mode, clutch 75 is disengaged and combustion engine 122 provides electric power which is converted by converter 190 for storage in electrical energy storage device 158. Cruise mode logic control circuit 130 is responsive to a plurality of vehicle operating parameters, e.g., vehicle speed 132, and accelerator pedal information 160 so as to provide cruise mode logic output control signals 140, and 150 to control operation of electric motor 12 and quasi constant torque combustion engine 122. Quasi constant torque combustion engine 122 may be, e.g., an I.C. engine or an external combustion engine, such as a low power Stirling engine, and a pollution processing apparatus 198 can be utilized, such as an afterburner as shown. Electric motor 12 may be a DC motor or an induction motor; however, if an induction motor is used, then an inverter will be required to convert DC from the fast charge-discharge battery art other DC storage batteries 158 to AC.

It will become apparent to those skilled in the art that cruise mode logic control circuit 130 may comprise a microprocessor responsive to further vehicle operating parameters. In the use of a microprocessor, further fine-tuning of the present system embodiments may be provided, e.g., to vary the responses to the aforementioned cruise mode control parameters of vehicle speed and predetermined time periods at such speed and predetermined time periods as desired, or such microprocessor may detect loss of vehicle speed in the cruise mode and automatically revert to electric propulsion. The microprocessor may be further programmed to also control clutch functions and transmission functions as desired, to synchronize their operation in the system.

The microprocessor may be further utilized by the programmer to also control electrical energy storage 158, e.g., by utilizing the I.C. engine during cruise mode OFF condition to charge a fast charge-discharge battery while utilizing a further fast charge-discharge battery previously fast charged to power the electric motor, and then switching the further fast charge-discharge battery to the charging path of the I.C. engine during the next cruise mode OFF condition. The microprocessor may further switch to a further battery to power the vehicle in the event no fast charge-discharge power source is adequately charged to power the vehicle and return to a fast charge-discharge battery when sufficiently fast charged. Factors such as rate of charge of fast charge-discharge batteries and power consumption of the electric motor are considerations for the system designers and programmers.

HYBRID MOTOR VEHICLE

System Specifications

POWER PLANT
1. Electric motor (state-of-the-art).
2. Internal Combustion Engine (state-of-the-art).
   a. Relatively constant speed and torque, low horsepower (20 to 30% of current) for satisfying power demands in the cruise mode.

POWER SOURCES
1. Fast charge batteries (state-of-the-art).
2. Internal Combustion Engine:
   a. powering the vehicle during the cruise mode; and
   b. charging the fast charge batteries during the non-cruise mode.

MODES OF VEHICLE OPERATION
1. Idle

At zero (see FIG. 2), speed (e.g., waiting for red lights in city traffic), I.C. propulsion engine power transferred via battery charging system to electrical energy storage having fast charge batteries.

2. Acceleration and low speed operation.

Propulsion from electric motor with continued fast charge of energy storage having fast charge batteries.

3. Cruise Mode (low load operating region for motor vehicle).

Propulsion from internal combustion engine upon satisfaction of cruise mode operating conditions. No discharge of energy storage.

4. High Performance, High Torque Demand Situations, e.g., sudden acceleration required to pass another motor vehicle.

Reversion to electric motor drivee upon operator accelerator demand.

5. Pollution and efficiency characteristics
   Minimal under electric power;
   Lower power I.C. engine running at relatively constant speed and torque results in double the efficiency.

The horsepower rating of the I.C. engine since utilized for propulsion in the cruise mode is e.g., only 20 to 30 percent of the horsepower which would be required to operate the vehicle over its entire operating range (as in present automobiles), also adding greatly in further reducing emissions and simplified control of such reduced emissions.

Eliminating an engines speed and torque variations doubles its efficiency, and cuts its emissions by about another ten-fold—(two orders of magnitude in all).

6. Meeting California Emission Requirements.

Hybrids could easily meet California's transitional low emissions standards and ultra-low emissions standards which begin to take effect in 1994, and reach their maximum limits in 2003.

7. Manufacturers' Warranty Costs
   a. Electric motor, accessible for repairs as compared to large internal combustion engines in current production automobiles.
   b. Low Horsepower (20 to 30% of current I.C. h.p. engines) internal combustion engine running under relative constant speed and torque conditions is not subject to greatly varying operating demands. Less wear, and small engine repair.

8. Efficiency of Operation
   a. Extended range through use of cruise mode power.
   b. Maximum conservation of energy through conversion of low h.p. I.C. engine power output directly to fast charge internal storage for reuse in the system. No idle internal combustion engine power capacity wasted during cruise mode as in present automobiles with engines having three or four times the horsepower capacity.

INTERACTIVE CONTROL IN RESPONSE TO POLLUTANT LEVELS

Figure 4:
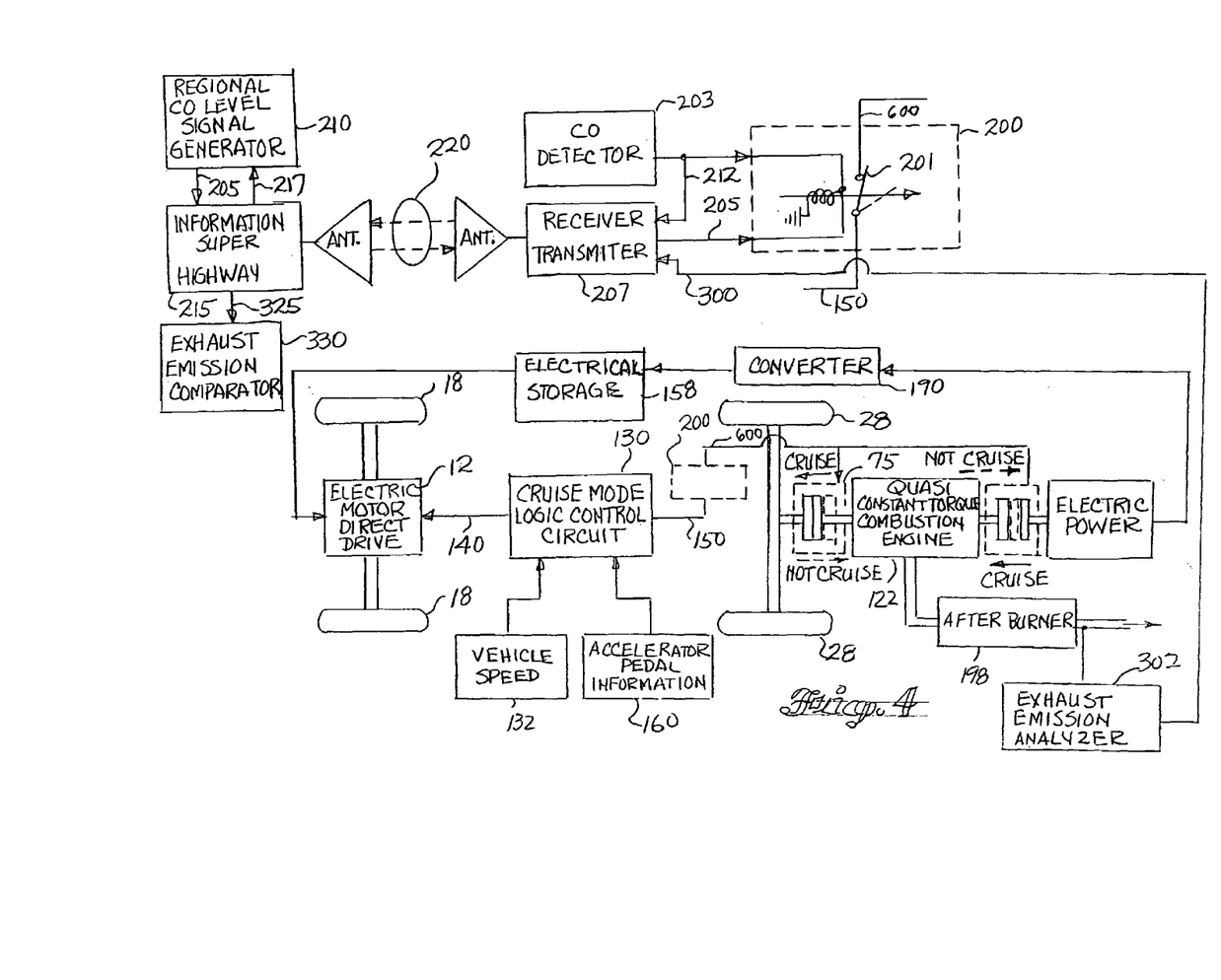
FIG. 4 is a system block diagram of another embodiment of the invention showing interactive control of system operating in response to pollutant levels; and, FIG. 5 is a diagram of the present ambient pollutant processing feature.

Turning now to the system of FIG. 4, it can be seen that hybrid system control circuit 200 modulates cruise mode logic output control signal 150 by interrupting the circuit path through opening of switch 201 (dotted line representing open position), when either (1) CO detector 203 drives switch 201 open in response to a CO level above a predetermined ambient CO level around the vehicle or (2) a signal 205 from receiver transmitter 207 drives switch 201 open, signal 205 being transmitted as the output from regional CO level signal generator 210 through data links comprising information super highway 215. In either case, opening of switch 201 (to dotted line position) interrupts the signal to path for cruise mode logic output signal 150 thereby interrupting cruise mode operation and preventing quasi constant torque combustion engine 122 from powering of the vehicle and causing reversion to electric motor 12 powering of the vehicle. Decision by the responsible regional air quality director to shut down combustion engine operation of individual or all of the hybrid vehicles in the region can be based upon whether signals 212 of respective ones of CO detectors 203 are ON or OFF (as transmitted through the interactive information network comprising receiver transmitter 207, and information super highway 215 as signal 217 to the decision making location comprising regional CO level signal generator 210. Upon a decision to shut down combustion engine operation CO level signal generator 210 transmits signal 205 to the respective individual ones of the vehicles. Information superhighways are well known as data transmission systems e.g., such as shown in U.S. Pat. No. 4,755,988 issued Jul. 5, 1988. The present information super highway may include a microwave data link 220 having a subscriber station comprising receiver transmitter 207 e.g., such as a cellular telephone of the present digital type adapted to receive and transmit signals 212, 205, and 300 (signal 300 being generated by exhaust emission analyzer 302), and telephone switching networks including telephone lines for coupling signals 217 and 205 to and from the location of regional CO level signal generator 210.

While pollution control signals hereinbefore described were CO signals, other pollutant level information signals, e.g., $NO_x$ may also be detected and processed through the present system.

VEHICLE SYSTEM ANALYSIS BY MANUFACTURER UTILIZING INFORMATION SUPERHIGHWAY

In FIG. 4, it should be noted that exhaust emission analyzer 302, typically on apparatus of the type utilized at service stations as a diagnostic tool for analyzing engine operation has a data information output signal 300 therefrom coupled through the information super highway comprising e.g. the present cellular microwave link 220 from cellular digital type receiver transmitter 207 through telephone switching networks and telephone lines represented by signal path 325 to a remote location e.g., the manufacturer's factory site which includes an exhaust emission computer where data information output signal 300 is simply compared to other standard data such as e.g. factory specification data and analyzed to see if e.g. emission systems are defective or other engine performance characteristics are indicative of engine tuneup, parts replacement, engine rebuild etc. The manufacturers can identify the vehicle owner through the cellular telephone number identification transmitted from the receiver transmitter 207 accompanying the exhaust emission analyzer data signal 300 transmitted and then obtain the model and engine data to be compared through identification of the vehicle purchased by the telephone owners name from manufacturers records and notify vehicle owners of the deficiencies discovered.

While the system of FIG. 4 shows reversion from cruise mode to electric power (by opening switch 201) through pollutant level sensing aboard the vehicle, regional level control of cruise mode operation (also by opening of switch 201) is also shown and either or both (as shown) may be utilized depending upon how tight it is desired to further control emissions of hybrid vehicles. The system of FIG. 4 provides for transmission of vehicle generated operating data (e.g. exhaust emission signals 300 from exhaust emission analyzer 302) through information super highway 215 to a utilization device (exhaust emission comparator 330) however, other vehicle operating data, (as shown on e.g. displays in U.S. Pat. No. 5,084,822 and 5,315,298) could also be transmitted through information super highway 215 to a utilization device which could comprise a home television set (coupled through a cable TV system) displaying such information as vehicle location data through further coupling through the information super highway thereby enabling visual monitoring of the vehicles progress. It will become apparent to those programmers and system designers skilled in the art following the teachings of the present invention that other vehicle operating data may be transmitted to further compatible utilization devices. E.G. position location and vehicle control data can be interchanged with a central computer for navigation of the vehicle through complex highway networks from one location to another where the driver programs in his location and final desired destination.

Figure 5:
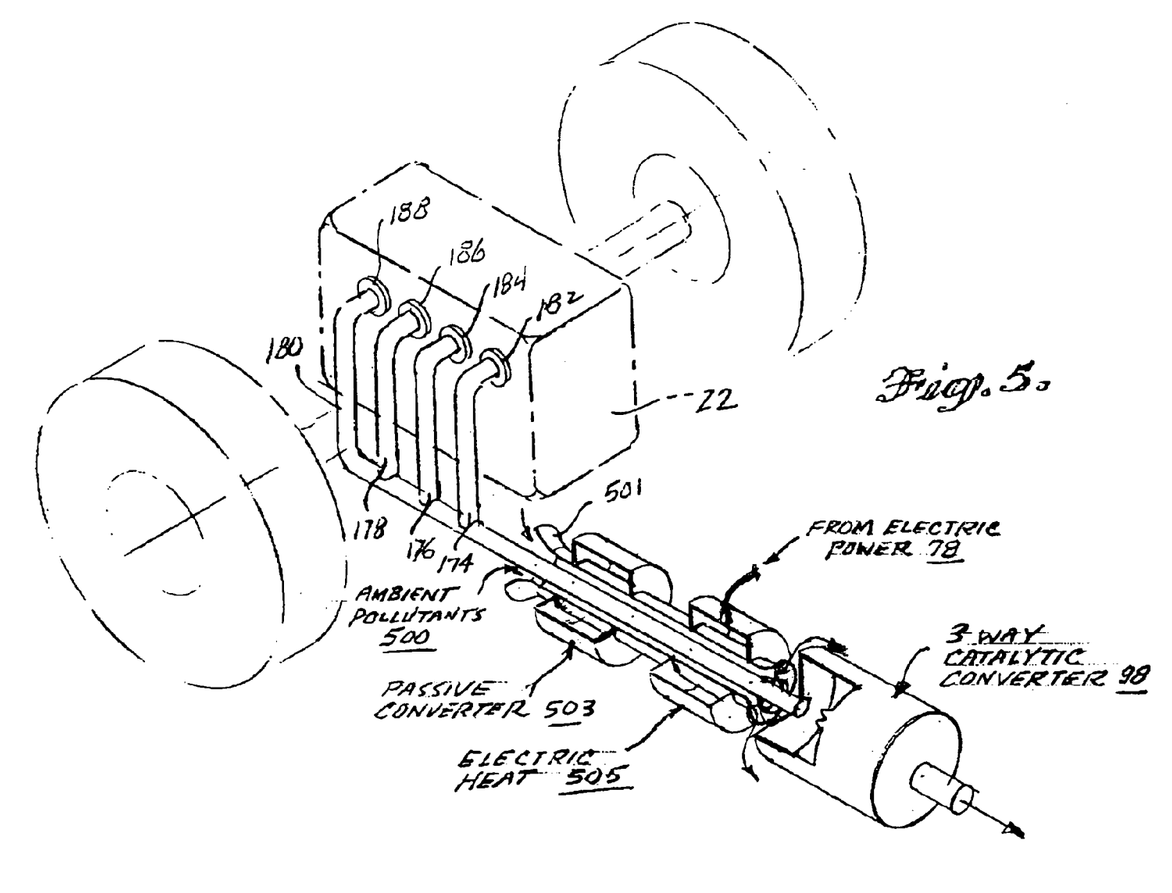

Turning now to the ambient pollutant processing system of FIG. 5 it can be seen that a standard internal combustion engine 22 has an exhaust manifold 172 connected to cylinder exhaust lines 174,176,178, and 180 leading from exhaust ports 182,184,186 and 188 respectively. At the downstream end of exhaust manifold 172 there is a conventional 3 way catalytic converter 98. As noted in my U.S. Pat. No. 3,889,464 at low exhaust temperatures, 3 way catalytic converters are ineffective since not having reached light off temperatures and one solution is to heat the cool exhaust up to temperatures required to activate the 3 way catalysts. Another solution is to electrically heat the catalyst directly as shown in U.S. Pat. No. 5,170,624. A further solution is to utilize a catalytic converter having a catalyst with a lower light off temperature for processing an individual pollutant, e.g. carbon monoxide requiring a temperature of only 390 degrees F. Instead of the much higher temperatures required for processing of the other pollutants processed by 3 way catalytic converters. The literature has even suggested painting catalysts that work at summer temperatures on merely a warm surface such as air conditioner compressors and automobile radiators. The present system is an open system in contrast to present closed systems with 3 way catalytic converters in that ambient pollutants 500 are funneled through an inlet comprising a flared open scoop 501 located beneath the vehicle and along the outer surface of high temperature exhaust manifold 172 which operates in the 1,800 degree F. range. In the present system the catalyst in passive catalytic converter 503 surrounds the outer wall of exhaust manifold 172 instead of the inner wall 3 as shown at line 20, column 5 of my U.S. Pat. No. 3,788,284. Catalysts selected for use in passive catalytic converter 503 depend upon exhaust manifold 172 outer wall surface temperatures. Electrically heated catalytic converter 505 may comprise an electrically heated catalytic converter 192 of the type shown in U.S. Pat. No. 5,170,624 the details of which are incorporated herein by reference. The electrically heated internal structure surrounds the outer wall surface of exhaust manifold 172 thus further deriving heat therefrom (and requiring less electrical power) when the exhaust flowing through exhaust manifold 172 has reached normal elevated temperatures. Power for electrically heated catalytic converter 505 may be utilized from any electrical power source when surplus power is available e.g. from electric power 78 as shown in FIG. 3 when operating in the electric power mode and surplus power is available, that is when not needed to full charge energy storage 158.

The invention claimed is:

1. A controller of a hybrid electric vehicle having an engine (22) and a motor (12) for controlling driving of the engine (22) and the motor (12), comprising
 a battery (58) for supplying electric power to the motor (12);
 motor-generated driving force transfer means (14) for transferring the driving force generated by the motor (12) to wheels (18);
 a power generator (78) driven by the engine (22) to supply generated electric power to the battery (58);
 engine-generated driving force transfer means (75) for transferring the driving force generated by the engine (22) to the wheels (28);
 means for detecting a vehicle running state (44); and
 control means (30) for controlling whether to transfer a driving force generated by an engine (22) to a power generator (78) or wheels (28) in accordance with a vehicle running state, wherein the control means (30) transfers the driving force generated by the engine (22) to wheels (28) when said running state is more than a predetermined value, transfers the driving force generated by the engine (22) to the power generator (78) when said running state is less than a predetermined value.

2. A controller according to claim 1 wherein said control means (30) sets a period for transferring driving forces generated by the engine (22) to wheels (28) when said running state changes from a value less than a predetermined value to a value larger than a predetermined value.

3. A controller according to claim 2 wherein said period is about 45 seconds.

4. A controller according to claim 1 wherein said running state is vehicle speed.

5. A controller according to claim 4 wherein said vehicle speed is about 40 miles per hour.

6. A hybrid motor vehicle comprising in combination:
 an engine;
 an electric motor;
 a storage device;
 said electric motor powering said hybrid motor at lower speeds;
 said engine powering said vehicle at high speeds; and said engine operatively connected through a charging path for charging said battery at lower speeds
 wherein said speed demands do not drop below 40 mph for predetermined time periods of 45 seconds.

* * * * *